United States Patent [19]
Speed

[11] 3,981,720
[45] Sept. 21, 1976

[54] FOAMING OF METAL BY THE CATALYZED AND CONTROLLED DECOMPOSITION OF ZIRCONIUM HYDRIDE AND TITANIUM HYDRIDE

[75] Inventor: Sidney E. Speed, Stonington, Conn.

[73] Assignee: Swiss Aluminum Limited, Chippis, Switzerland

[22] Filed: Feb. 7, 1972

[21] Appl. No.: 224,104

Related U.S. Application Data

[63] Continuation-in-part of Ser. No. 30,886, April 22, 1970, Pat. No. 3,676,071, which is a continuation-in-part of Ser. No. 866,776, Oct. 15, 1969, abandoned, which is a continuation of Ser. No. 593,969, Nov. 14, 1966, abandoned.

[52] U.S. Cl. .................................. 75/20 F; 75/138
[51] Int. Cl.² .......................................... C22B 5/02
[58] Field of Search .................. 75/20 F, 20 R, 138, 75/68

[56] References Cited
UNITED STATES PATENTS

| 2,974,034 | 3/1961 | Fiedler et al. | 75/20 F |
| 3,087,807 | 4/1963 | Allen et al. | 75/20 F |
| 3,676,071 | 7/1972 | Speed | 75/20 F |

*Primary Examiner*—Walter R. Satterfield
*Attorney, Agent, or Firm*—Robert H. Bachman

[57] ABSTRACT

A process of foaming metal and particularly aluminum and its alloys by catalyzing and controlling the solid state decomposition of a material which releases a gas at elevated temperatures comprising mixing a discrete particulate material containing a major proportion of aluminum with zirconium hydride or titanium hydride, heating the resultant compact at a temperature of 850° to 900°F for at least 5 minutes and then adding said compact to a molten metal melt.

8 Claims, 2 Drawing Figures

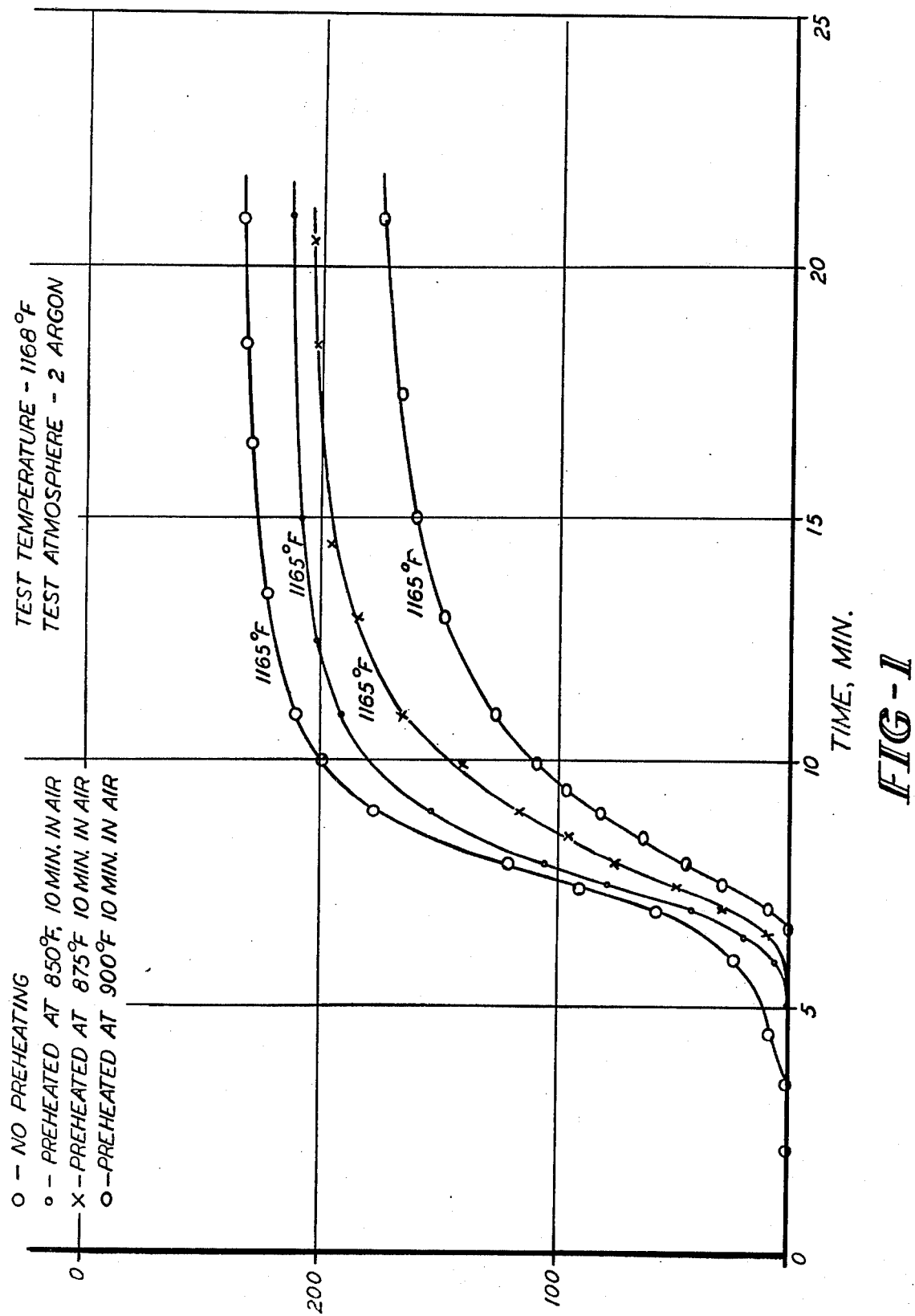

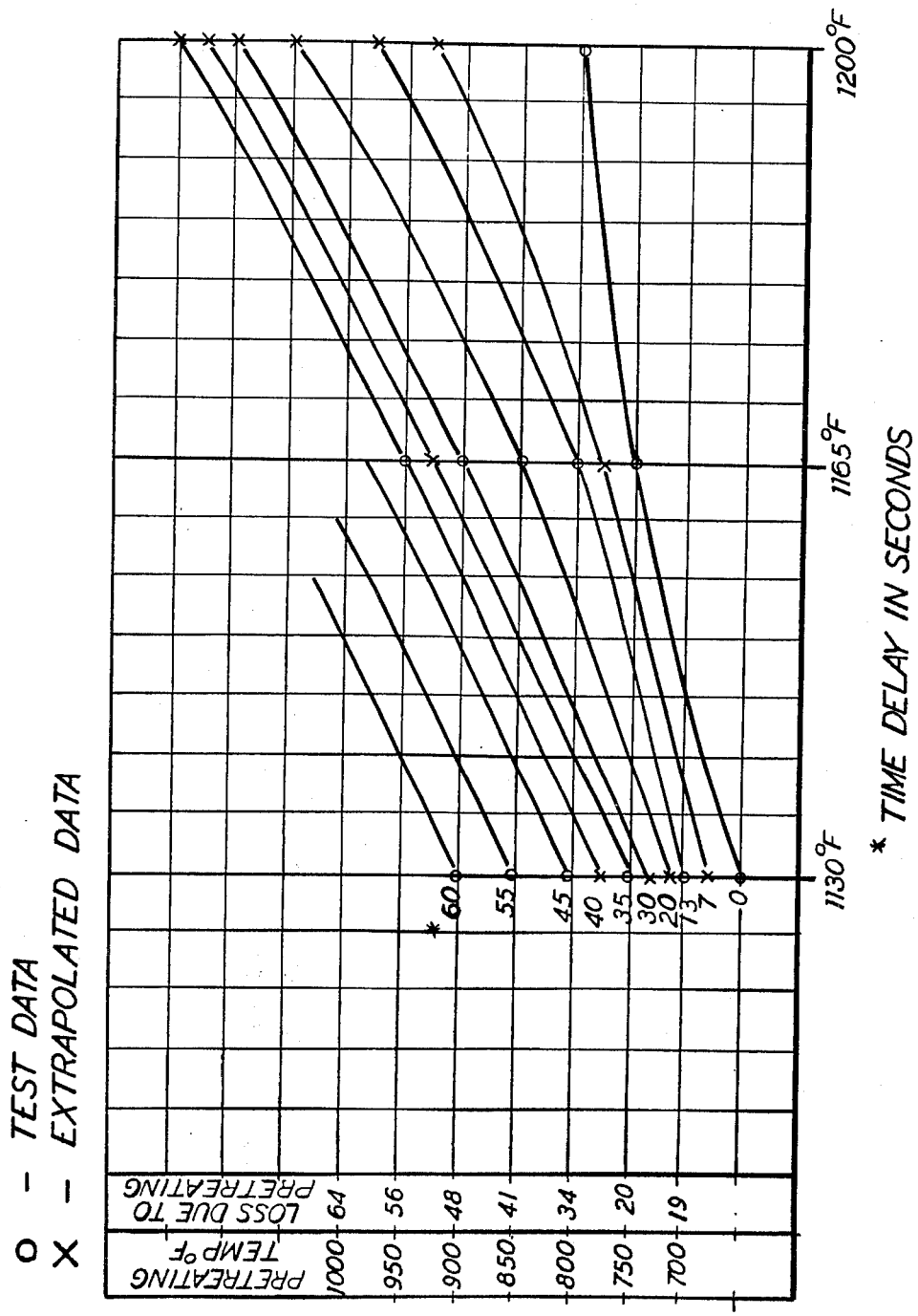

FOAMING OF METAL BY THE CATALYZED AND CONTROLLED DECOMPOSITION OF ZIRCONIUM HYDRIDE AND TITANIUM HYDRIDE

This application is a Continuation-In-Part of copending application Ser. No. 30,886, filed Apr. 22, 1970, now U.S. Pat. No. 3,676,071, which is in turn a Continuation-In-Part of Ser. No. 866,776, filed Oct. 15, 1969, now abandoned, which is in turn a Continuation of Ser. No. 593,969, filed Nov. 14, 1966, now abandoned.

The present invention relates to foaming of metal and particularly to foaming of aluminum and its alloys by the solid state decomposition of a material which releases a substantial amount of gas in the molten metal melt at elevated temperatures.

Foamed aluminum and its alloys are well known and in wide use in applications wherein the light weight of the foamed material is essential without or due loss of strength per unit volume.

It is also well known that foamed aluminum and its alloys may be prepared by the addition of a gas releasing material which when added to a molten melt foams the melt and thereby produces foamed metal upon cooling.

Numerous materials decompose in the solid state to release a substantial amount of gas at elevated temperatures. These materials and in particular zirconium hydride and titanium hydride have been used in order to develop some practical use for this decomposition reaction.

The principal disadvantages of these materials, however, are that normally complete decomposition reaction occurs at temperatures too elevated to find practical and convenient application.

It is therefore highly advantageous to develop some method for catalyzing and controlling the onset of the solid state decomposition of these materials in order to increase the range of practical applications for the gas evolution reaction in the foaming of aluminum and its alloys.

Accordingly, it is a principal object of the present invention to foam metal and preferably aluminum and its alloys by catalyzing and controlling the onset of the solid state decomposition of material such as zirconium hydride and titanium hydride.

It is a further object of the present invention to provide a process as above which is inexpensive and convenient to employ.

Further objects of the present invention will appear hereinafter.

It has now been found that in accordance with the present invention the foregoing objects may be readily obtained and a convenient and inexpensive process provided for foaming of metal and preferably aluminum and its alloys by catalyzing and controlling the onset of the solid state decomposition of a material which releases a substantial amount of gas at elevated temperatures.

The process of the present invention comprises intimately admixing a discrete particulate material which decomposes at elevated temperatures to release a substantial amount of gas selected from the group consisting of zirconium hydride and titanium hydride, and a discrete particulate material containing a major proportion of aluminum in an amount of at least 0.8 part by weight based on the amount of aluminum per part of decomposable material, and heating said admixture in an oxidizing atmosphere at a temperature of from 850° to 900°F for about 5 to about 45 minutes and preferably for about 5 to about 20 minutes. The admixture is then added to a molten metal melt such as an aluminum or aluminum alloy melt and thereby heated at a temperature which decomposes said decomposable material, and normally at a temperature less than about 1200°F.

It has been found that when the foregoing process is performed, substantial and in fact surprising catalysis and control of the decomposition reaction is obtained.

This will be more readily apparent from the appended examples and drawings which form a part of the present specification in which:

FIG. 1 shows the delay of onset of gas evolution and hydrogen potential exhaustion.

FIG. 2 shows the addition time required to the onset of foaming molten metal.

In accordance with the present invention, it is critical that discrete particles of the decomposable material are intimately admixed with discrete particles of a material containing a major proportion of aluminum. The particular particle sizes of both the decomposable material and the aluminum containing material are not necessarily critical; however, the particle sizes should be less than 190 microns. Naturally, the smaller the particle sizes the more intimate the admixture will be and the more surface area of the respective particles will be contacted.

The particular aluminum containing material is not necessarily critical except that the aluminum or the aluminum alloy which is used should contain a major proportion of aluminum. Aluminum or aluminum alloys containing 90% aluminum or more are preferred and in fact high purity aluminum is particularly preferred. The aluminum containing material may contain associated therewith in whole or in part aluminum oxide.

In addition to the above alloys which may be employed are also the aluminum-magnesium alloys, aluminum-silicon alloys, aluminum-copper alloys, aluminum-zinc alloys, aluminum-magnesium zinc alloys, etc.

The decomposable material may be any of those listed above, namely zirconium hydride, and titanium hydride.

The proportion of decomposable material to aluminum containing material is a critical aspect of the present invention. It is necessary that the aluminum containing material be utilized in an amount of 0.8 part by weight based on the amount of aluminum per part of decomposable material. The particular proportions may vary depending upon the particular decomposable material utilized but in no case will there be utilized less than 0.8 part by weight of aluminum containing material. For example, when titanium hydride is used at least 1.5 parts by weight of aluminum containing material is used based on the amount of aluminum per part of decomposable material. Naturally, an excess of aluminum containing material may be employed; however, it is not necessary and not preferred to use too great an excess of aluminum containing material per part of decomposable material.

The initial pretreatment comprises dehydrizing the surface layer of the decomposable material by heating the admixture in an oxidizing atmosphere at a temperature of 850° to 900°F to form zirconium or titanium metal and hydrogen gas. The material is then rapidly oxidized to form a surface oxide layer. Thus, a displacement reaction occurs in the oxidizing atmosphere and may be represented by the following equation, as for example, for zirconium hydride.

$$ZrH_2 + O_2 \rightarrow H_2 + ZrO_2$$

In general from between 5 to 45 minutes are required for the above reaction to go to completion.

The size and configuration of the compact formed of the admixture is not critical so long as the decomposable material in the center portion of the compact is substantially oxidized in addition to the decomposable material closer to and at the surface of the compact.

Preferably, but not necessarily the admixture is compacted before the pretreatment to provide compacts of a suitable size for ease of handling.

If desired the compacting and pretreating steps may be combined where convenient, i.e., the admixture may be hot compacted with the temperature and time limitations of the pretreating step.

The above-described pretreatment provides for the formation of an oxide barrier layer which slows the decomposition rate of the metal hydride. In particular the physical barrier serves first to delay the onset of decomposition and then acts as a modulator of the reaction once it comences. The modulating effect occurs since the oxide surface limits the diffusion of hydrogen formed within the particle after decomposition begins which in turn limits, or controls, further decomposition as a function of the hydrogen partial pressure as expressed by the following equations:

$$2ZrH_2 \rightleftarrows 2ZrH + H_2 \quad (1)$$

$$2ZrH \rightleftarrows 2Zr + H_2 \quad (2)$$

The discussed pretreatment step provides for increased control in the production processes for forming of aluminum and its alloys by making possible greater latitude and flexibility in the timing of such processes. This is so since maximum and predictable volumes of hydrogen gas may be provided at a prespecified temperature and over a predetermined time span.

If desired, the intimate compacted admixture may be stored in this condition for any desired length of time until such time as one desires to utilize them for practical application.

The intimately admixed and compacted particulate materials are then added to the metal melt and preferably an aluminum or aluminum alloy melt.

The admixture is thereby heated at an elevated temperature and preferably below 1200°F and most preferably from 570° to 1200°F. Normally in excess of 1200°F the decomposable reaction is too rapid and the temperatures are too excessive for many applications.

As an alternative embodiment of the present invention the intimate admixture may be compacted following the pretreatment, if desired. Thus, the intimate admixture is first pretreated by heating in an oxidizing atmosphere at a temperature of 850° to 900°F to form titanium or zirconium metal and hydrogen gas; the aforementioned metal then being rapidly oxidized to form a surface oxide layer, and the admixture is then compacted in any suitable manner.

An example of a method of compacting which is suitable to this invention comprises vibrating of the admixture into a suitable aluminum, or aluminum alloy, tube or other suitable vessel. The filled tube is then subjected to the aforementioned heating step of the present invention.

The treated admixture, whether loose or in compacted form is then added to a melt of molten metal and preferably of aluminum and its alloys. The admixture may be added directly to the melt or more conveniently wrapped or otherwise suitably packaged in, for example aluminum foil and then dropped into the melt. Although relatively large chunks or compacts of the admixture will tend to sink beneath the surface of the melt due to their relatively greater specific gravity it is preferred to plunge the packaged or compacted admixture beneath the surface of the melt by means of a suitable tool to insure the desired reaction. If the uncompacted admixture is employed in unpackaged form the melt should be suitably stirred during the addition to insure an initial rapid mixing. Stirring of the melt after the addition of the compacted and packaged admixtures is also preferred in order to achieve a uniform reaction throughout the melt.

When the admixture is subjected to the heating step by addition to a bath of molten metal such as aluminum or its alloys thermal decomposition without a catalytic reaction first occurs which causes subfracture of the pretreated hydride particles. Surface area of increasing size are thus exposed of the hydride to the molten aluminum and catalytic decomposition then commences.

In accordance with the present invention it has been found that foaming of the aluminum melt is significantly delayed after the pretreatment and addition of the admixture to molten aluminum as shown in FIG. 2, as contrasted with about 20 seconds without the pretreatment step. Naturally the exact amount of delay is dependent upon the pretreating temperature and time at any specified temperature.

It has also been surprisingly found that loss of the hydrogen potential during the pretreatment step is minimal and generally does not exceed about 22%, depending upon the time and temperature of the pretreatment. For example, it has been found that the aforementioned loss was only about 1% at 850°F for 10 minutes, which is a sufficient amount of time at this temperature for effective pretreatment.

Thus, the present invention provides for a catalytic decomposition of zirconium and titanium hydrides at a temperature range which is practical and convenient in foaming of aluminum and its alloys, as well as providing for a controlled and predeterminable rate of decomposition of the hydrides.

The present invention will be more readily apparent from the following illustrative examples.

EXAMPLE I

This example shows the catalytic decomposition of $ZrH_2$ without preheating the compact before adding the compacted mixture to an aluminum melt.

A blend of 8 weight percent $5\mu$ $ZrH_2$ particles and 92 weight percent $150\mu$ Al-10% magnesium alloy was compacted at a pressure of 31 tsi. The compacted admixture was added to 1000 grams of Al-10% magnesium alloy in an amount of about 0.28 weight percent $ZrH_2$, at a melt temperature of 1165°F, with violent breaking up and mixing into the melt. Rapid foaming of the melt occurred in about 20 seconds after introducing the admixture into the melt.

EXAMPLE II

The compacted admixture of Example I was first pretreated, in accordance with the present invention at a temperature of 875°F for 30 minutes and then compacting at 31 tsi. The admixture was then added to 1000 grams of A-218 alloy in an amount of 0.28 weight percent $ZrH_2$ at a melt temperature of 1165°F exactly as in Example I. Rapid foaming of the melt did not commence for about 190 seconds and the hydrogen potential was not exhausted until about 390 seconds after introducing the admixture into the melt. Thus, in accordance with the present invention, a time delay of about 170 seconds was achieved.

EXAMPLE III

A blend of 8 weight percent $5\mu$ $ZrH_2$ particles and 92 weight percent $150\mu$ Al-10% magnesium alloy was compacted at 31 tsi and tested in the compacted condition, and in the compacted and pretreated condition at various temperatures for a time period of 10 minutes.

In this example the heating was carried out in a tube type furnace and the gas evolution was measured by the displacement method, with gases collected and measured at approximately 25°C and at approximately 1 atmosphere (curves not reduced to S.T.P.).

The results, as shown, in FIG. 1, clearly show the effect of varying pretreatments upon the delay of onset of gas evolution and hydrogen potential exhaustion and how these factors may be predetermined.

EXAMPLE IV

The compacted admixture of Example I was tested after compacting and pretreating at various temperatures for a period of 15 minutes, and then adding the compacted admixture to 1000 grams of Al-10% magnesium alloy in an amount of 0.28 weight percent $ZrH_2$ at various melt temperatures. The results, as shown in FIG. 2, show the effect of various temperatures of pretreating at various elevated temperatures, for a time period of 15 minutes in effecting a time delay to the onset of foaming, i.e., addition time required to the onset of foaming when the pretreatment step is employed.

This invention may be embodied in other forms or carried out in other ways without departing from the spirit or essential characteristics thereof. The present embodiment is therefore to be considered as in all respects illustrative and not restrictive, the scope of the invention being indicated by the appended claims, and all changes which come within the meaning and range of equivalency are intended to be embraced therein.

What is claimed is:

1. A process for producing foamed metal by catalyzing and controlling the solid state decomposition of a material which releases a substantial amount of gas in molten metal which comprises:
   A. intimately admixing a discrete particulate material which decomposes at elevated temperatures to release a substantial amount of gas selected from the group consisting of zirconium hydride and titanium hydride and a discrete particulate material containing a major proportion of aluminum in an amount of at least 0.8 part by weight based on the amount of aluminum per part of decomposable material;
   B. heating said admixture at a temperature range of 850° to 900°F for at least 5 minutes to form a surface oxide layer upon said hydride; and
   C. adding said admixture to a melt of molten metal to foam said metal.

2. The process of claim 1 wherein said melt comprises a material selected from the group consisting of aluminum and its alloys.

3. A process according to claim 2 wherein following step A and prior to step B said admixture is compacted.

4. A process according to claim 2 wherein following step B and prior to step C said admixture is compacted.

5. A process according to claim 2 wherein simultaneously with the heating of step B said admixture is compacted.

6. The process of claim 2 wherein said decomposable material is zirconium hydride.

7. The process of claim 2 wherein said decomposable material is titanium hydride.

8. The process of claim 2 wherein said heating of Step B is from 5 to 30 minutes.

* * * * *